United States Patent [19]

Gilmore et al.

[11] 4,239,786
[45] Dec. 16, 1980

[54] COFFEE WHITENER AND USE OF FLUID SHORTENING THEREIN

[75] Inventors: Cecilia Gilmore; Donald E. Miller, both of Strongsville, Ohio

[73] Assignee: SCM Corporation, New York, N.Y.

[21] Appl. No.: 51,994

[22] Filed: Jun. 25, 1979

[51] Int. Cl.³ .............................................. A23C 11/02
[52] U.S. Cl. .................................. 426/601; 426/602; 426/606; 426/613
[58] Field of Search .............. 426/601, 602, 603, 604, 426/606, 613

[56] References Cited

U.S. PATENT DOCUMENTS

| | | | |
|---|---|---|---|
| 3,514,298 | 5/1970 | Noznick et al. | 426/613 X |
| 3,935,325 | 1/1976 | Gilmore et al. | 426/613 |
| 4,025,659 | 5/1977 | Cho et al. | 426/613 |
| 4,046,926 | 9/1977 | Gardiner | 426/613 |
| 4,092,438 | 5/1978 | Tonner | 426/613 X |

*Primary Examiner*—Robert A. Yoncoskie
*Attorney, Agent, or Firm*—Richard H. Thomas

[57] ABSTRACT

A coffee whitener having as major ingredients, dry basis, a sweetner, a water-dispersible protein, and a lipid system, wherein said lipid system is a fluid shortening comprising a hydrogenated, beta-tending, predominantly $C_{16}$-$C_{18}$ oil having an IV of about 85-100 and a solid-fat index at 50° F. of about 10-18; and stably dispersed therein, a stabilizing amount of a fine crystalline; normally solid phase fat or fatty acid derived food stabilizer component; and an emulsifying amount of an oil/water emulsifier. The fluid shortening is capable of being metered into the coffee whitener formulation during manufacture, and is capable of use at substantially reduced levels as compared to conventional lipid systems for coffee whiteners.

19 Claims, No Drawings

COFFEE WHITENER AND USE OF FLUID SHORTENING THEREIN

The present invention relates to an improved coffee whitener formulation, and to a method of making the same. Such coffee whiteners contain as major ingredients a sweetening agent, a water-dispersible protein and a lipid system. The present invention is particularly directed to improvements in the lipid system.

The present invention is primarily applicable to the preparation of spray dried coffee whiteners, but also has application in the preparation of liquid coffee whiteners, and coffee whiteners having freeze-thaw stability.

BACKGROUND OF THE PRESENT INVENTION

Coffee whiteners have traditionally been of the liquid or powder type. In some years, coffee whiteners have also been marketed in the frozen state which some success, particularly in view of public acceptance accorded to frozen foods for their convenience in handling and storage.

A typical coffee whitener formulation is described in the Journal of American Oil Chemical Society, 46, J. H. Hetrick, 1969, having the following composition:

| Vegetable fat | 10–12% |
|---|---|
| Corn syrup solids | 8–10% |
| Sodium caseinate | 1–1.5% |
| Emulsifier | 0.2–1.0% |
| Buffer | 0.1–0.5% |
| Stabilizer | 0.02–0.5% | the remainder being water. A spray dried formulation is essentially the same except that no stabilizer is required. With water removed, the fat content is about 35–50% with the relative proportions of other ingredients being about the same.

In the above formulation, the buffer systems are added to prevent "feathering" of the protein when added to hot tea or coffee. The buffers are usually dipotassium phosphate, disodium phosphate, or sodium citrate.

In the preparation of coffee whiteners, it has been considered important to use a fat or oil which is bland or neutral in flavor and has, particularly for a spray dried product, long-term stability against oxidation and the development of rancidity. For this purpose, fats which are highly saturated have been preferred. The prior art has also felt that the fat must have a sufficiently high solids content at temperatures usually encountered in storage and ordinary handling, in the case of spray dried products, for the fat to remain in a solid state during storage and handling; Food Technology, 23, W. H. Knightly, 1969. At the same time, the solids content of the fat should be sufficiently low to avoid leaving a waxy mouth-feel when used with hot beverages.

To meet these criteria, particularly for spray dried whiteners, it has been conventional practice to employ hydrogenated lauric-containing fats which are solid at room temperature, for instance a coconut oil having about 48.5% lauric acid content an IV of about 4 max. and a Wiley Melting Point of about 92°–114° F.

One problem is that the fats, being solid at ordinary room temperatures, must be heated and made molten for addition to the rest of the coffee whitener formulation during manufacture, requiring the expenditure of energy. In addition, about half of the typical coffee whitener formulation, not including water, is vegetable fat. Whitening occurs as a result of light being reflected from the surface of the finely divided fat globules, and it has been determined that 35–50% is approximately the optimum amount of fat necessary to obtain the desired whitening power. This is the case whether the formulation is for a spray dried product or a conventional liquid or freeze-thaw stable coffee whitener formulation.

It is known to use partially hydrogenated domestic oils, for instance soybean, cottonseed and peanut oil, as the lipid system for fluid or frozen coffee whiteners. Such oils are desirable because of their polyunsaturated dietary feature. Because they are refrigerated or frozen, limited shelf life is not as much of a problem. Also, the use of such oils provide processing flexibility, particularly in that they are readily metered in admixture with the remaining ingredients of the coffee whitener formulation.

Still, with spray dried formulations, it has been conventional practice to use a lauric-containing fat, such as coconut oil, for stability and bland taste.

Prior U.S. Pat. No. 3,935,325, issued to Cecilia Gilmore and Donald E. Miller and assigned to assignee of the present application, describes a liquid pareve coffee whitener composition which is characterized by being stable to phase breakdowns on repeated freeze-thaw cycles, without loss of whitening power. The coffee whitener of said prior patent comprises a normally aqueous emulsion of vegetable fat, vegetable protein, carbohydrate, stabilizer and emulsifier, the latter comprising a monoglyceride, a partial fatty acid ester of hexitol, an ethoxylated partial fatty acid ester of hexitol and stearoyl-2-lactylic acid. The teachings of prior U.S. Pat. No. 3,935,325 are incorporated by reference herein.

SUMMARY OF THE PRESENT INVENTION

The above and other disadvantages are overcome in accordance with the concepts of the present invention, wherein there is provided a method for the manufacture of a coffee whitener, which comprises mixing together as major ingredients a sweetener, a water-dispersible protein, and a lipid system, the balance being water; wherein said lipid system is a shortening comprising a hydrogenated, beta-tending or forming, predominantly $C_{16}$–$C_{18}$ fat which is bland in flavor having an IV between about 85–100, an SFI at 50° F. of about 10–18, and stably dispersed therein a stabilizing amount of a fine crystalline, normally solid phase fat or fatty acid derived food stabilizer component and an emulsifying amount of an oil/water emulsifier, said shortening at normal temperature being pumpable but sufficiently stiff (viscous) to resist phase separation of ingredients. The mixing of the coffee whitener ingredients is carried out by metering said shortening into the remaining ingredients of the coffee whitener. By "normal temperature", it is meant room temperature, e.g. about 70° to about 95° F.

For purposes of the present application, the fat derived food stabilizer component is a 0–5 IV stearine. The fatty acid derived food stabilizer component is an emulsifier which is capable of crystallizing from a heated molten condition in admixture with fat to a fine crystalline solid condition on cooling to about ambient temperature. Preferably, a stabilizing amount is about 2 to about 4% based on the total weight of the shortening.

Preferably the shortening of the present invention is prepared by fluidization, defined as physically blending the components of the shortening at an elevated temperature sufficient to form a substantially homogeneous melt and then cooling said melt and subjecting the same to mild agitation for a sufficient time and at a temperature to develop beta-crystallization of fat and emulsifier solids in the shortening.

In a preferred embodiment, the coffee whitener formulation is subjected to spray drying to prepare a spray dried product.

A principal advantage of the present invention resides in the ability to meter the lipid system into the other ingredients of the coffee whitener in the continuous manufacture of the same. The specific selection of lipid ingredients including the fine crystalline food component provides a unique combination which resists phase separation while satisfying other criteria of the whitener formulation.

Another principal advantage resides in the use of the predominantly $C_{16}$-$C_{18}$ fat having an IV between about 85-100, and an SFI at 50° F. of about 10-18. Such a fat is in a fluid state at room temperature and also has a relatively high degree of unsaturation.

A direct correlation exists between the amount of unsaturation in a fat and the functional properties of the resulting whitener. It is believed that a reaction may occur between the double bonds of the highly unsaturated fat and the protein of the coffee whitener resulting in a product having increased whitening power or reflectivity. This permits use of the lipid system of the present invention at a fat level of up to about 25% less than required with conventional fats.

In this regard, the lipid system can be employed in the coffee whitener formulation in an amount as low as 21% fat content, up to 50% or higher, dry basis. By dry basis, it is meant free of water, in the case of a spray dried product, or free of consideration of the amount of water employed, in the case of a liquid or freezable coffee whitener.

Although unsaturation is associated with decreased stability (oxidation and development of rancidity), it was found that, particularly in the case of a spray dried product, employing a $C_{16}$-$C_{18}$ fat having an IV above about 85 avoided rancidity. Thus the present invention, in a preferred aspect, resides in the discovery of an IV window of about 85-100 for the fat by which a combination of properties are achieved. Specifically, the fat does not become rancid, over a reasonable shelf period. At the same time, the fat is usable at much reduced levels. Still further the fat is meterable into other ingredients of the coffee whitener, as an emulsified shortening. This latter property is also due in part to the selection of a beta-tending or forming $C_{16}$-$C_{18}$ fat which permits fluidization of the shortening. It was also found that the shortening of the present invention resisted oiling-off (conventionally associated with the use of oils in spray dried products) under ordinary handling and storage conditions.

Preferably the shortening of the present invention has a viscosity of about 500-4,000 cps, at 80° F., as measured on a Brookfield Viscometer Model LVF, using appropriate spindles at 60 RPM.

Although the present invention is not limited in its broadest aspect to specific ranges, generally the sweetener of the coffee whitener will comprise about 40-70% of the coffee whitener formulation. The protein will comprise about 4-6% of the formulation (based on actual protein content) and the lipid system about 21-50%. All of these percentages are on a dry weight basis. The above percentages do not preclude the presence of minor ingredients in the formulation, such as flavor, buffer and stabilizer (in the case of fluid or frozen coffee whiteners).

With regard to the shortening itself, this will generally comprise (by weight) about 88-89% oil, about 2-4% fine crystalline component (as indicated above), and about 9-10% emulsifier. A preferred amount of stearine is 2-3%. Additional minor ingredients may, if desired, be included in the shortening, such as an antioxidant or preservative. Tertiary butyl hydroxyquinone (TBHQ) is a useful anti-oxidant in the shortening of the present invention. Citric acid may be used in small amounts as a fat perservative.

In a preferred embodiment of the present invention, for a spray dried product, the emulsifier is a soft (plastic) mono-diglyceride having a Capillary Melting Point of about 120°-130° F.

For the purposes of the present application, the term "beta-tending" means that the fat is capable of crystallizing substantially completely to the beta-polymorphic form on cooling from a molten condition.

The term "stearine" means that high melting point crystallizing fraction which is obtained by hydrogenation of fats to an IV of about 0-5.

"SFI" (solid-fat index) is a measure of the dilatometry of the solid phase coexisting with the liquid phase of a fat at a given temperature, and can be measured by AOCS Official Method Cd 10-57.

Beta-tending or forming hydrogenated fats useful in accordance with the concepts of the present invention include corn oil, soybean oil, peanut oil, rapeseed oil, rice bran oil, sunflower oil, safflower oil, sesame oil and olive oil. These oils characteristically have a low lauric acid content (less than about 1%) and high $C_{16}$-$C_{18}$ contents. They are readily hydrogenated to an IV of about 85-100, and at such partial hydrogenation are in a normally flowable state at room temperature, e.g. 70° F., and at 50° F. have a maximum solid-fat index of about 10-18.

In the hydrogenation of the fats of the present invention to an IV in the range of about 85-100, hydrogenation conditions are employed, normally using molecular hydrogen gas, to eliminate some of the highly reactive polyethanoic unsaturation in the oil, or mixture of oils.

A preferred fat that may be employed in the shortening of the present invention is a 95 IV soybean oil having an SFI at 50° F. of about 12.

Still another suitable oil is Durkex 100 (trademark, SCM Corporation), again a partially hydrogenated soybean oil having a WMP (Wiley Melting Point) of about 65° F., and an SFI at 50° F. of about 11 maximum. Durkex 100 has an IV of about 85-90 maximum.

The purpose of the stearine or hard crystalline emulsifier component is to provide a crystal matrix during cooling onto or within which further crystallization takes place. Any stearine or fine crystalline emulsifier component is capable of providing such a matrix. Preferably, however, the stearine is also beta-tending derived from soybean oil, peanut oil, safflower oil, hydrogenated lard, sesame oil, olive oil and sunflower oil. Beta-tending solid stearines may be identified by X-ray diffraction wherein polymorphic forms are identified using a Phillips X-ray Diffractometer Goniometer coupled with a strip chart recorder. The goniometer has a scanning range of 17° to 25° and the beta-polymorphic form displays identifying peaks at 19.4°, 23.0° and 24.0°, respectively. The IV of the stearine may range from 0 to 5, and advantageously, such stearine should have a Capillary Melting Point of about 140°–160° F., preferably between about 152° and 158° F.

Prior U.S. Pat. No. 3,914,452 by Max E. Norris, assigned to assignee of the present invention, describes the preparation of stable fluid shortenings using about 2 to 8 parts stearine and a soft mono- and diglyceride emulsifier, in at least about 40 parts vegetable oil. The shortening is subjected to fluidization to achieve stability. In the patent, the function of the stearine in the manufacture of a stable shortening is described in detail. The disclosure of this patent is incorporated by reference herein.

In prior U.S. Pat. No. 4,137,338, to Ilija Gawrilow, also assigned to assignee of the present invention, it is disclosed that stability in a fluid system can be obtained using a fine crystalline, normally solid component other than a stearine. Examples given in this patent are normally solid crystallizable emulsifiers such as an alkali or alkaline earth metal salt of an acyl lactylate, or alternatively a succinylated mono- and diglyceride. The two most common acyl lactylates are sodium and calcium stearoyl-2-lactylate, known as "Emplex" and "Verv" (trademarks, C. J. Patterson Company), described in U.S. Pat. No. 2,733,252. The manufacture of succinylated mono- and diglycerides is disclosed in National Dairy Products Corporation U.S. Pat. No. 3,370,958.

In addition to these two emulsifiers, it is also possible to achieve stabilization with other normally solid, fine crystalline emulsifier components, such as are obtainable from a hard mono- and diglyceride. An example of one such emulsifier is Dur-em 117 (trademark, SCM Corporation), a mono- and diglyceride emulsifier, having 40% minimum α-monoglyceride, an IV of about 5, and a Capillary Melting Point (CMP) of 145°–150° F.

Another suitable hard crystallizable emulsifier useful as a matrix is a propylene glycol mono- and diester of fats and fatty acids, an example being Durpro 187 (trademark, SCM Corporation), having a propylene glycol mono- and diester content of about 50–60%, a monoglyceride content of about 10–15% and a Capillary Melting Point of about 115°–125° F.

The disclosure of prior U.S. Pat. No. 4,137,338 is incorporated by reference herein.

Selection of an oil/water emulsifier for the shortening of the present invention is within the skill of the art. In this regard, the emulsifier can be any emulsifier used in the preparation of oil/water emulsions. The emulsifier should be fat soluble or dispersible when used at the level necessary for the emulsification desired.

Any normally hard or soft, beat-tending mono- and diglyceride having a monoglyceride content from about 30 to about 90, the remainder being mainly di- and triglycerides, and an IV of about 5 to about 85 can be employed. A preferred such emulsifier, especially for a spray dried product, is Dur-em 204 (trademark, SCM Corporation) derived from hydrogenated soybean oil and containing citric acid and BHA. The mono- and diglyceride has a 52% minimum monoglyceride content, an IV of 65–75, and a Capillary Melting Point of about 120°–130° F.

The amount of the emulsifier employed should be sufficient to maintain an oil/water emulsion of the whitener formulation. For this purpose, preferably a plastic emulsifier is employed. At functional levels, hard emulsifiers could cause set-up or excessive viscosity of the fluid shortening formulation. With use of an emulsifier such as a mono- and diglyceride, for a spray dried product, about 9–10% based on the weight of the shortening maintains the whitener formulation as an emulsion form until spray drying takes place.

Another suitable emulsifier is Dur-em 114 (trademark, SCM Corporation), a mono- and diglyceride derived from soybean oil having a monoglyceride content of about 40%, an IV of 70–75 and a Capillary Melting Point of about 110°–120° F.

For a liquid whitener, it is preferable to employ a blend of emulsifiers, such as EC-117 (trademark, SCM Corporation), a blend of mono- and diglycerides and lactylic esters of fatty acids. Such emulsifier has a WICLA (Water Insoluble Combined Lactic Acid) of about 4.8% (minimum), a mono-diglyceride content of about 24–32%, and a Capillary Melting Point of about 123°–133° F. This emulsifier provides freeze-thaw stability for the liquid whitener. For a liquid whitener suitable for refrigeration storage, where freeze-thaw stability is not necessary, a mono-diglyceride such as Dur-em 117 (trademark, SCM Corporation), a mono- and diglyceride in the form of a white bead from hydrogenated vegetable oils (containing citric acid) having a mono-diglyceride content of about 40% (minimum), an IV of about 5 max., and a Capillary Melting Point of about 145°–150° F., can be used. This compound, as noted, can also function as the fine crystalline component.

Other fat soluble or dispersible emulsifiers which can be used in the shortenings and coffee whiteners of the present invention include distilled monoglycerides; ethoxylated fatty acid esters such as ethoxylated mono- and diglycerides; acyl lactylates such as sodium or calcium stearoyl-2-lactylate; succinylated mono- and diglycerides; propylene glycol monoesters; and polyoxyethylene-containing fatty acid esters such as polysorbate 60.

For a spray dried product, blends of emulsifiers can be used, for instance a mono- and diglyceride with a lactylic ester of a fatty acid, or with Verv or Emplex (supra), but no particular advantage was noted in so doing.

The ethoxylated fatty acid esters, and their manufacture, are described in Egan U.S. Pat. No. 3,433,645, incorporated herein by reference. The fatty acid radicals are higher fatty acid chains preferably having about 12 to about 18 carbon atoms. A preferred class of compounds are the ethoxylated mono- and diglycerides which are the polyethoxylated fatty acid esters of glycerol and may conveniently be described as mixtures of stearate, palmitate and lesser amounts of myristate partial esters of glycerin condensed with about 18 to 22 moles of ethylene oxide per mole of α-monoglyceride. Santelle EOM is manufactured from hydrogenated vegetable oils and has an acid value maximum of 2, an hydroxyl value of 60–80, and an IV number based on fatty acid content of 3 maximum and an oxyethylene content of 60.5–65.0%.

Useful polyoxyethylene-containing fatty acid esters are the polysorbates such as polyoxyethylene sorbitol distearate, polyoxyethylene sorbitan monostearate, polyoxyethylene sorbitan monolaurate, as well as other similar ethoxylated fatty acid esters. An example of a suitable propylene glycol monoester is Myverol P-06 (trademark, Eastman Chemical) having an IV of about 5 and a congeal point of about 113.

In practice, the fluid shortening of the present invention is prepared by mixing together the shortening ingredients, namely the oil, stearine and emulsifier, at a sufficiently elevated temperature of about 150°-160° F. to obtain a molten mixture. This molten mixture is then precooled to about 130°-150° F. and pumped to a first Votator Unit "A" (trademark, Chemetron Corporation) wherein the mixture is rapidly cooled to a chilled blend at a temperature of about 80°-90° F. The mixture is then pumped to a Votator "B" Unit wherein the chilled blend temperature is maintained substantially the same and the mixture is agitated to produce a stabilized, uniform dispersion. After a short holding time within the Votator "B" Unit, the fluid shortening mixture is then passed at 90°-93° F. exit temperature to a stehling tank where it is continuously agitated for a more extended period, for instance about 24 hours. A preferred stehling temperature is about 85°-93° F. In the Votator "B" Unit there is an initial development of beta-crystal form and removal of heat released during the fat crystal formation. Then in the stehling tank, the agitation is continued for a sufficiently long period of time to effect substantially complete, for instance 90-95%, conversion to the beta-crystal form.

The resulting fluid shortening has good stability against phase separation, upon repeated temperature cycling between 75° and 95° F., and can maintain a stable dispersion for prolonged periods. In accordance with known theory, it is believed that the solid hardstock stearine (or other hard crystalline component) initially crystallizes within the liquid vegetable oil upon rapid cooling in the Votator "A" Unit. Upon further cooling, the mono- and diglycerides, or other emulsifier, are believed to associate with the solid hardstock so as to hold the same suspended within the vegetable oil, the mono- and diglycerides having limited affinity for both the oil and such hardstock. Further cooling is believed to cause the mono- and diglycerides to become suspended within the oil providing a stabilized dispersion wherein said components are stably dispersed within the oil.

It is understood that the shortening of the present invention can contain other components, for instance color, flavor and other emulsifiers in combination with the mono- and diglycerides to achieve certain properties. One example is the use of lactylic esters of fatty acids to achieve freeze-thaw stability, as disclosed above with reference to the emulsifier EC-117.

The sweetening agent which may be employed in the coffee whitener of the present invention may be any of those conventionally used in the production of imitation dairy products, and combinations thereof. Preferably a substantial portion of the sweetening agent is dry corn syrup solids to add bulk to the composition without excessive sweetness. One suitable dry corn syrup solids sweetener available on the market is Dri-Sweet 36, trademark Hubinger Company, having a D.E. (dextrose equivalent) of 36. Where less sweetness is desired, a maltodextrin may be employed. Sucrose and dextrose may be employed in combination with the dry corn syrup solids. The amount and ratio of dry corn syrup solids to sucrose or other sweetener is not critical except with regard to the level of sweetness and bulk desired. Generally the amount of sweetening agent employed will be in the range of about 40 to about 70%, again depending upon the level of sweetness and bulk desired (dry basis).

The water-dispersible or soluble protein can be any of a number of proteins normally employed in imitation dairy products, for instance soy protein, non-fat milk solids, whey solids, fish protein, a water-soluble or dispersible salt of casein such as calcium caseinate or sodium caseinate, or a cottonseed protein. Other suitable proteins are yeast proteins such as torula yeast "Torutein-94" (trademark, Amoco Foods Company). A preferred amount of protein is about 4-6% on a dry basis, actual protein. Sodium caseinate is 90% protein and would be used at the approximate 4-6% level. If non-fat milk solids is used, the amount of actual protein in the solids, about 35%, must be taken into account, and a larger amount, for instance about 11-13%, may be required.

EXAMPLE 1

This example illustrates preparation of a shortening in accordance with the concepts of the present invention. The shortening was produced from the following ingredients:

| | |
|---|---|
| 95 IV soybean oil having an SFI of about 12 maximum at 50° F. | 88.28% |
| Soybean stearine (0-5 IV) | 2.12% |
| Dur-em 204 (52-55% α-monoglyceride) | 9.50% |
| Tenox 20 (trademark, Eastman Chemical) | 0.10% |
| Total | 100.00% |

Tenox 20 is an anti-oxidant containing 20% TBHQ and 10% citric acid, the balance being propylene glycol.

These ingredients were charged into a holding tank, heated to about 150°-160° F., and were agitated until a molten mixture was obtained. The molten mixture was precooled and then pumped at a temperature of about 130° F. to a first Votator Unit "A" wherein the mixture was rapidly cooled to a chilled blend at a temperature of approximately 86°-87° F.

The mixture was then pumped at the temperature of about 86°-87° F. for throughput (mild agitation) in a Votator "B" Unit wherein the chilled blend temperature was maintained at about 90°-92° F. exit temperature to produce a stabilized uniform dispersion.

The fluid shortening mixture was then continually agitated at about 85°-92° F. in a stehling tank for a period of about 18 hours to produce a stable fluid shortening.

The resulting stabilized fluid shortening was a substantially uniform dispersion with the following characteristics:

Phase Stability:

There was 0 to 5% dissociation measured by a centrifuge test using a 50 milliliter graduated test tube and centrifuging at 1,500 RPM for 15 minutes.

Viscosity:

After fluidization, viscosity of the fluid shortening at 80° F. was measured to be about 1,000 cps (using the Brookfield Viscometer described above).

Solid-Fat Profile:

Measurement was by American Oil Chemical Society Test No. Cd 10-57.

| | |
|---|---|
| 50° F. | 14.2 |
| 70° F. | 7.4 |
| 92° F. | 4.4 |

| -continued | |
|---|---|
| 100° F. | 2.9 |

Long-Term Phase Stability:

After 30 days, 0–2% separation by volume resulted from centrifuging 15 minutes at 1,500 RPM.

Beta-Polymorphic Form:

Conversion to the beta-crystal form was substantially complete.

The shortening of this example also showed good flavor stability over reasonable shelf periods.

EXAMPLE 2

In this example, the fluid emulsified shortening of the present invention (Example 1) was tested in a spray dried coffee whitener and compared with a coffee whitener formulation containing a partially hydrogenated coconut oil, in accordance with the prior art. In this particular example, the partially hydrogenated coconut oil was "Hydrol 100" (trademark, SCM Corporation), a plastic coconut oil having a Wiley Melting Point of about 98°–102° F.

The following table gives the proportions of ingredients used. In the first run, 36.5% of the shortening of Example 1 was employed in the formulation. In the second run, 33.03% of Hydrol 100 was employed, along with 3.47% emulsifier (Dur-em 204). In the third run, the amount of shortening of Example 1 was reduced by about 25% to the 27.38% level.

The reflectance readings obtained, following preparation of the whiteners, show that even at the 25% reduced usage level, a reflectance equivalent to that obtained with Hydrol 100 was achieved. At equivalent levels, a much greater degree of whitening power was obtained using the shortening of the present invention.

In the following table, samples 1 and 3 were prepared by adding the $K_2HPO_4$ to water, agitating the same for about five minutes, then adding the sodium caseinate and corn syrup solids to the water and heating the mixture to about 130° F. with continued agitation. The shortening of Example 1 was then added in the amounts given and the mixture was heated to about 165° F. After mixing at this temperature, the mix was subjected to homogenization in a two-stage homogenizer at 2,500 psi and 500 psi, respectively. Subsequently, the mix was spray dried using a dryer inlet temperature of about 230°–240° F., a chamber temperature of about 200°–220° F., and an outlet temperature of about 104°–114° F. The slurries prior to spray drying were about 50% water. Sample 2 was prepared using the same method, except that the Dur-em 204 and the Hydrol 100 were separately proportioned in preparing the whitener.

The reflectance was measured by employing 7.25 grams whitener per 160 milliliters of coffee made by adding 1.06 grams Maxim Instant Coffee per 100 milliliters of Water.

The Agtron Instrument used in measuring reflectance is made by Magnuson Engineers of San Jose, CA. In this test, the whitened coffee is poured into an Agtron cup to ¾ full and the cup is placed in the instrument reflectance colorimeter which has been standardized with the 07-44 disc using a green filter. Higher reflectance readings are indicative of greater whitening power.

| COMPARISON OF DELTA WHITE WITH HYDROL 100 IN DRIED COFFEE WHITENERS | | | |
|---|---|---|---|
| Ingredient | Sample 1 Percent | Sample 2 Percent | Sample 3 Percent |
| Sodium caseinate | 5.00 | 5.00 | 5.00 |
| $K_2HPO_4$ | 2.00 | 2.00 | 2.00 |
| 24 D.E. corn syrup solids | 56.50 | 56.50 | 65.62 |
| Delta White | 36.50 | — | 27.38[1] |
| Hydrol 100 | — | 33.03 | — |
| Dur-em 204 | — | 3.47 | — |
| Total (dry basis) | 100.00 | 100.00 | 100.00 |
| Reflectance[2] | | | |
| Temperature, °F. | 164 | 162 | 154 |
| Reading | 54 | 41 | 40 |

[1] 25% reduced usage level
[2] Measured in an Agtron Unit Model M400A standardized with 07-44 discs using a green filter (5 units are visually significant).

The spray dried whiteners of samples 1 and 3 under ordinary storage conditions, e.g. room temperature, were found to resist rancidity for prolonged periods, for instance six months. Oiling-off of the spray dried product at ordinary handling and storage temperatures also was not a problem.

What is claimed is:

1. A method for the manufacture of a fluid composition useful as a coffee whitener which comprises mixing together as major ingredients a sweetener, a water-dispersible protein, a lipid system, and water;

wherein said lipid system is a shortening comprising hydrogenated, beta-forming, predominantly $C_{16}$–$C_{18}$ fat which is bland in flavor having an IV between about 85–100 and an SFI at 50° F. of about 10–18; and stably suspended therein, a crystalline, normally solid phase fat or fatty acid derived food stabilizer component in an amount sufficient to form a stable shortening dispersion; and an emulsifying amount of an oil/water emulsifier;

said shortening at room temperature being pumpable but sufficiently stiff to resist phase separation of ingredients;

said mixing being carried out while metering said shortening into remaining ingredients of the composition.

2. The method of claim 1 wherein said ingredients form an emulsion, further including the step of spray drying said emulsion.

3. The method of claim 2 wherein said shortening is prepared by fluidization.

4. The method of claim 2 wherein said crystalline stabilizer component is a stearine or a crystalline hard emulsifier.

5. The method of claim 2 wherein said lipid system comprises at least about 21% of the composition.

6. The method of claim 2 wherein the composition has the following formulation:

| sweetener | 40–70% |
|---|---|
| water-dispersible protein | 4–6% |
| lipid system | 21–50% |

7. The method of claim 2 wherein said shortening comprises about 88–89% oil, about 2–3% of a 0–5 IV stearine stabilizer and about 9–10% oil/water emulsifier, said shortening having a viscosity of about 500–4,000 cps as determined on a Brookfield Viscometer, Model LVF, at about 80° F.

8. The method of claim 7 wherein said emulsifier is a mono- and diglyceride having a Capillary Melting Point of about 120°–130° F.

9. The method of claim 2 wherein said shortening comprises at least about 25% of the composition, said composition providing a reflectance of not substantially less than about 40, when used in coffee, as measured in an Agtron Reflectometer Model M400A standardized with 07-44 disc using a green filter.

10. A coffee whitener made by the method of any of claims 1–9.

11. A composition useful as a coffee whitener comprising as major ingredients, a sweetener, a water-dispersible protein and a lipid system wherein said lipid system is a shortening and comprises
- a hydrogenated, beta-forming, predominantly $C_{16}$–$C_{18}$ fat which is bland in flavor having an IV between about 85–100, and an SFI at 50° F. of about 10–18;
- a crystalline, normally solid phase fat or fatty acid derived food stabilizer component in an amount sufficient to form a stable shortening dispersion, and
- an emulsifying amount of an oil/water emulsifier.

12. The composition of claim 11 obtained by spray-drying an aqueous emulsion.

13. The composition of claim 12 wherein said shortening is prepared by fluidization.

14. The composition of claim 12 wherein said crystalline stabilizer component is a stearine or a crystalline hard emulsifier.

15. The composition of claim 12 wherein said lipid system comprises at least about 21% of total weight of the formulation.

16. The composition of claim 12 having the following formulation;

| | |
|---|---|
| sweetener | 40–70% |
| water-dispersible protein | 4–6% |
| lipid system | 21–50% |

17. The composition of claim 12 wherein said lipid system comprises about 88–89% oil, about 2–3% 0–5 IV stearine stabilizer, and about 9–10% oil/water emulsifier.

18. The composition of claim 17 wherein said emulsifier is a mono- and diglyceride having a Capillary Melting Point of about 120°–130° F.

19. The composition of claim 11 wherein said shortening comprises at least about 25% of the composition, said composition providing a reflectance of not substantially less than about 40, when used in coffee, as measured in an Agtron Reflectometer Model M400A standardized with 07-44 discs using a green filter.

* * * * *